Oct. 24, 1961 L. HILLMAN ET AL 3,005,462
CONTROL SYSTEM AND METHOD OF OPERATION
Filed Jan. 29, 1959 2 Sheets-Sheet 1

INVENTORS
LEON HILLMAN
RICHARD A. BOLZ
BY
ATTORNEY

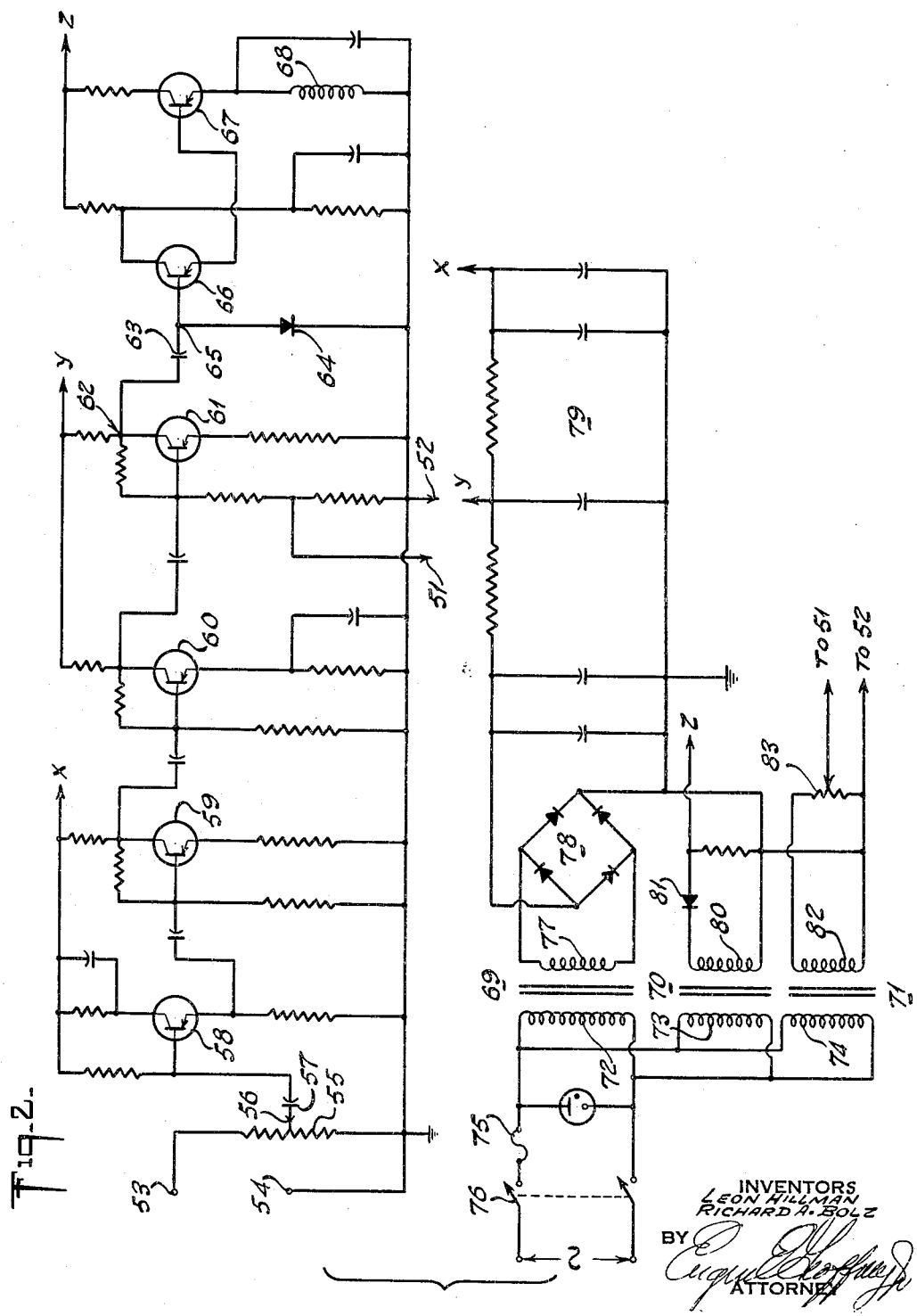

United States Patent Office 3,005,462
Patented Oct. 24, 1961

3,005,462
CONTROL SYSTEM AND METHOD
OF OPERATION
Leon Hillman, Englewood, N.J., and Richard A. Bolz,
Yonkers, N.Y., assignors to Johnson Service Company,
Milwaukee, Wis., a corporation of Wisconsin
Filed Jan. 29, 1959, Ser. No. 789,877
7 Claims. (Cl. 137—85)

This invention relates to control systems and more specifically to a novel and improved method and apparatus useful among other things for controlling the operation of mechanical or electrical equipment in response to changes in measurable condition.

Control devices are presently used in a wide variety of applications for the control of temperature, humidity, voltage, acidity of chemical baths, as well as numerous other purposes. Known systems, and particularly those intended for temperature and humidity control have not been found entirely satisfactory for many reasons including undue complication, lack of versatility in adjustment and stabilization and the lack of dependability, particularly when precise, uniform operation is required over long periods of time.

The above and other difficulties are overcome with the present invention which can be applied to a wide variety of applications and is characterized by its stability, relatively low cost, ease of adjustment and versatility.

In the measurement and control of temperature as well as other conditions, a resistive component is often used as the detecting means. Maximum change in voltage for a given change in resistance is usually attained by incorporating the resistive detector in a bridge circuit which, for convenience, is energized with A.C. In order to avoid ambiguity in the response of the device controlled by an A.C. bridge, a rectifier must be connected in series with the output of the bridge so that an output signal is produced only when the bridge is off balance in one direction. This procedure obviously limits the usefulness of the bridge as a detecting device and necessitates adjustment of the bridge elements to coordinate the balanced position of the control system with the temperature or other condition to be maintained. This procedure has been found to be an undesirable one if precision, dependability and maximum sensitivity are to be attained.

With the control in accordance with this invention, the detecting bridge can be arranged with pre-selected elements and energized with A.C. and the output signal from the bridge is then modified so that voltages produced by the bridge when deviating from the balanced position both directions can be utilized to attain any desired type of control. In addition, the invention affords means for controlling sensitivity and means for modifying the magnitude of the output signal for a given null or balanced bridge signal independently of the system sensitivity. With this arrangement, all ambiguity in the system is overcome and both sensitivity and relationship of the input and output signals can be independently regulated.

Another object of the invention resides in a novel and improved control device, responsive to an electric signal, that is phase sensitive and includes means for accurately adjusting the balanced condition of the system and in addition serves as a safeguard under conditions where the control signal may fail and thereby transmit false information to the equipment being controlled as, for instance, a boiler or other heating device.

Still another object of the invention resides in the provision of a novel and improved electropneumatic control device and method of operation affording a high degree of precision, dependability, sensitivity.

A still further object of the invention resides in a novel and improved electropneumatic device for producing changes in pressure in response to changes in an electric signal.

A further object of the invention resides in the provision of an improved stabilized control, wherein the balanced condition of the system can be modified without modifying or adjusting the condition responsive element or detector. With the use of a resistive element in a Wheatstone bridge as the detector, this invention further enables operation of the detecting bridge at maximum sensitivity at the balance or null position and the generation of a stabilized output signal of any desired magnitude within the limitations of the equipment.

The above and other objects and advantages of the invention will become more apparent from the following description and accompanying drawings forming part of this application.

In the drawings:

FIGURE 3 illustrates representative responsive curves of apparatus in accordance with the invention.

The design of control systems for use in controlling temperatures and other physical conditions presents numerous problems, particularly if the control must be adaptable for use under a wide variety of conditions. For instance, in controlling temperature, it is often necessary to adjust system sensitivity as well as the magnitude of the control signal for a balanced condition; with known devices the attainment of these ends is difficult and the change in one factor directly influences the other. In many instances, and particularly in connection with the measurement of temperature, resistance devices are usually employed and connected in a Wheatstone bridge circuit in order to obtain maximum sensitivity. Adjustment of such bridge networks to set the balanced condition of the system is highly undesirable generally produces instability occasioned by dirty contacts or contact potentials resulting from adjustable connections.

This invention overcomes these disadvantages and provides a highly stable and dependable control that can utilize pre-set detecting means and yet afford means for shifting the balanced condition of the system while taking advantage of the point of maximum sensitivity of the detecting device. These advantages will become evident from the illustrated embodiment of the invention now to be described.

Figure 1:
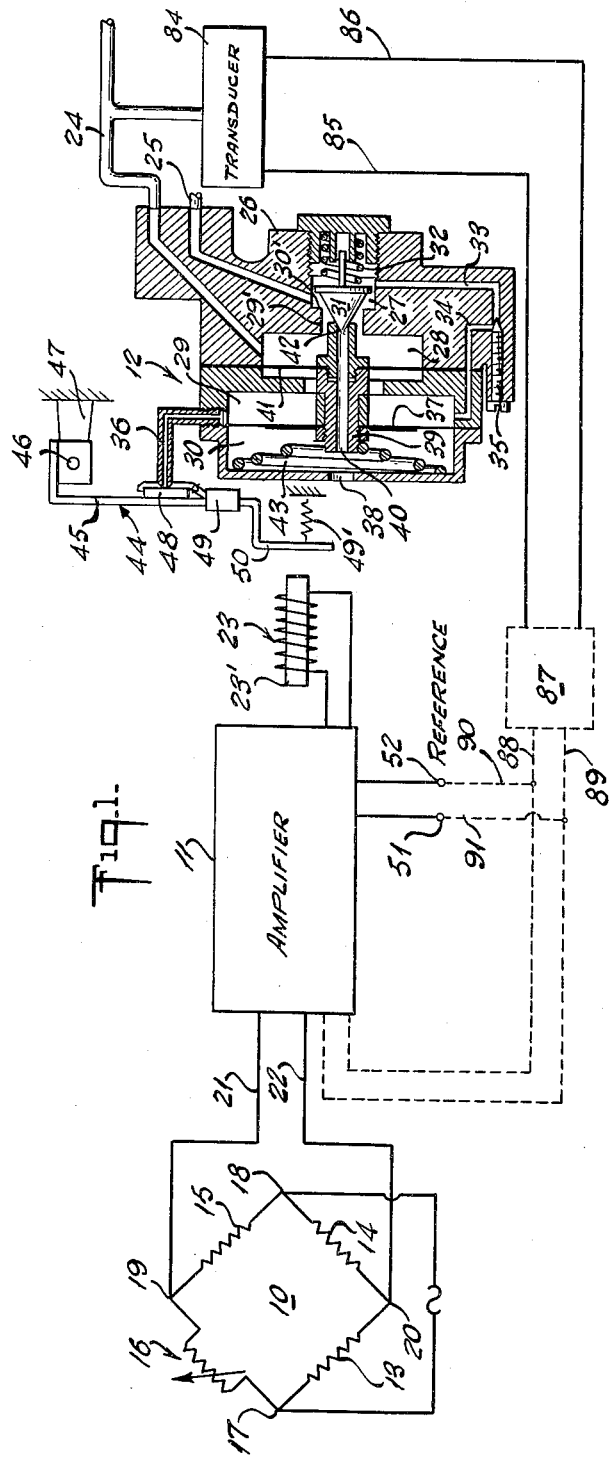
FIGURE 1 is a diagram of a control system in accordance with one embodiment of the invention.

Referring first to FIGURE 1, the illustrated control system includes three basic elements, namely, a Wheatstone bridge 10 forming the detector, an amplifier 11 and a pressure control device or relay 12. The bridge 10 is of conventional construction utilizing three fixed resistors 13, 14 and 15 and a condition responsive resistor 16. The resistor 16 may be responsive to temperature and either increase or decrease in resistance with an increase in temperature, depending on the nature of the material used. An alternating current is applied to terminals 17 and 18 of the bridge, while the output signal is obtained from terminals 19 and 20. With this invention, the elements 13 through 16 of the bridge need not be adjustable and accordingly, they may be selected to produce maximum sensitivity at the desired temperature or other physical condition to be controlled. The output signal of the bridge is obtained from the terminals 19 and 20 and is fed by the leads 21 and 22 to the amplifier 11. The output of the amplifier is connected to an electromagnet 23 forming part of the pneumatic control 12 and controls the fluid pressure in an output or branch line 24 constituting an output signal.

More specifically, the regulator or fluid pressure relay includes a housing 26 and a series of chambers 27, 28, 29 and 30. The main or primary supply of fluid or air pressure, as the case may be, enters the housing 26 through the inlet conduit 25 and is fed to the chamber 27. The chambers 27 and 28 are interconnected by an opening 29' with the edge 30' forming a seat for the spring loaded valve 31, which is normally urged against the seat 30 by the spring 32. Main fluid pressure is also supplied to the chamber 29 by conduits 33 and 34 and the flow of the air into chamber 29 is controlled by a needle valve 35. The chamber 29 includes a leak port 36, which, when open to the atmosphere, will maintain a substantially constant pressure in the chamber 29. A diaphragm 37 separates chambers 29 and 30, the latter having an opening 38 to the atmosphere.

A tubular exhaust assembly 39 is carried by the diaphragm 37 and has a central opening 40 extending therethrough. The exhaust assembly 39 extends through a second diaphragm 41 partitioning the chamber 29 and carries a valve seat 42 for cooperation with the valve 31. A spring 43 in the chamber 30 urges the exhaust assembly 39 to the right and into contact with the valve 31.

In operation, the spring 43 will hold the valve 31 away from the seat 30' with maximum pressure in the chamber 28. Under these conditions, the opening 40 in the exhaust assembly is closed by contact of the seat 42 with the valve 31. When the leak port 36 is closed, the pressure in the chamber 29 will increase and act on diaphragm 37 to compress the spring 43 and permit the valve spring 32 to close the main valve formed by the seat 30'. Further movement of the diaphragm 37 will open the exhaust port 40 to permit reduction of pressure in the chamber 28 and the branch or output line 24. It is therefore evident that by control of the rate at which air escapes through the leak port 36, any desired pressure in the output line 24 may be maintained, notwithstanding the main pressure applied through the conduit or inlet 25.

Control of the leak port 36 is effected, in this embodiment of the invention, by a valve assembly denoted by the numeral 44 and comprising a lever arm 45 pivoted at 46 to a fixed bracket member 47. The arm 45 includes a resilient seat 48 held in place by suitable clip means 49 and the seat 48 is urged into contact with the end of the leak port 36 by a biasing spring 49'.

In the instant embodiment of the invention, at least the lower portion 50 of the arm 45 is of magnetic material and is moved toward the core 23' of the electromagnet 23 when the latter is energized.

The amplifier 11 preferably includes, in addition to electric circuitry for amplifying the A.C. output signal from the bridge as previously described, rectifying means for rectifying the amplified signal in order to provide D.C. for operation of the electromagnet 23.

With the invention as described above, when the resistor 16 is changed in value by a change in temperature or other physical condition, it will produce an increased output voltage and if this increased signal is properly phased with the rectifier forming part of the amplifier 11, an increased voltage will be applied to the electromagnet 23. This will cause the arm 45 to be moved to the left as viewed in FIGURE 1, open the leak port and provide an increased pressure in the output line 24. The output pressure in the branch line 24 may be used to control suitable apparatus for modifying the physical condition being detected by the resistor 16 and change this physical condition to cause the bridge 10 to return its null or quiescent position.

According to the invention, the amplifier includes novel and improved means for adjusting the pressure in the branch line 24 to any selected value when the bridge 10 or other detector, as the case may be, is at its balanced or null position. This end is attained through the use of a separate reference voltage having a phase and frequency coordinated with the phase and frequency of the alternating current voltage fed to terminals 17 and 18 of the bridge or other detector. More specifically, this A.C. reference voltage is fed to appropriate terminals 51 and 52 of the amplifier 11 and it is combined with the amplified A.C. signal so that when the bridge is unbalanced in one direction, its amplified signal and the reference signal will add to produce an increased voltage and when the bridge is unbalanced in the opposite direction, the amplified voltage and the reference voltage will buck one another to produce a resultant difference voltage. By modifying the reference voltage, the branch pressure 24 of the regulator 12 can be readily and easily adjusted to any desired value with the bridge 10 in a balanced condition. This feature is illustrated in FIGURE 3 wherein curve A represents the normal A.C. output voltage obtained from the alternating current bridge and the signs + and − are used to indicate a change in phase of the alternating current. The curve B represents the output of the amplifier 11 of FIGURE 1 when zero voltage is applied to the terminals 51 and 52. Note that bridge unbalance in only one direction is reflected in the output voltage and dotted portion below the zero line is cancelled out because of the phase sensitivity of the rectifier. Curve C of FIGURE 3 represents the output signal from the amplifier 11 with a given reference voltage applied to the terminals 51 and 52. It will be observed that the null position of the bridge 10 has now been shifted above the zero axis and is denoted by the letter D and the bridge is therefore now operable on both sides of its null position. It will also be observed that the gain of the amplifier 11 has not been modified so that the change in the output signal with a given change in the bridge signal remains the same. Since the branch pressure in the line 24 is a function of the current fed to the electromagnet 23, as the null position of the bridge is shifted above zero axis, an increased current will be supplied to the bridge with the result that a lower pressure will be provided in the line 24. Thus, the branch pressure in the line 24 can be readily modified merely by changing the magnitude of the reference voltage applied to the terminals 51 and 52 of the amplifier. It is also evident from the foregoing that the magnet 23 and the spring 49' can be interchanged in order to reverse the relationship between the current in the magnet 23 and the pressure in the branch line 24.

Figure 2:
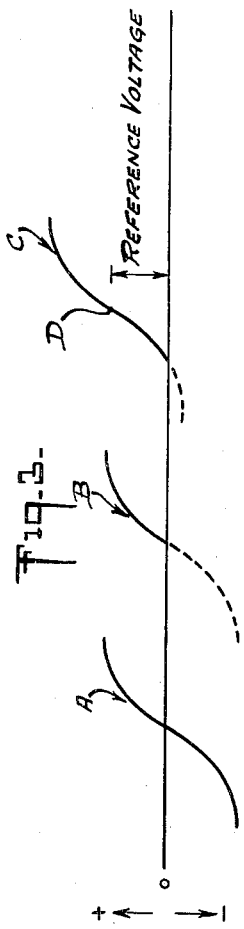
FIGURE 2 is a circuit diagram of the amplifier shown in FIGURE 1.

One circuit for attaining the operation described in connection with the amplifier 11 is illustrated in FIGURE 2. In this amplifier, the output of the bridge 10 is fed to the terminals 53 and 54, the latter being effectively at ground potential. The signal is applied across a potentiometer 55 and the adjustable contactor 56 is fed through a condenser 57 to the first transistor 58. The transistor 58, as well as the transistors 59, 60 and 61 are connected as conventional amplifiers to produce an amplified control signal at the terminal 62. While the illustrated transistors are of the PNP type, it is evident that any suitable transistor or other amplifying device may be employed. The amplified signal appearing at terminal 65 is fed through a coupling condenser 63 and is rectified by a suitable rectifier 64 so that the rectified voltage appears at terminal 65. This voltage is amplified by direct coupled transistors 66 and 67, the latter having a coil 68 in the emitter circuit which coil forms part of the electromagnet illustrated and described in FIGURE 1.

Power is provided for the amplifier by three individual transformers 69, 70 and 71 having their primaries 72, 73 and 74 respectively connected in parallel to a suitable source of alternating current through a fuse 75 and a control switch 76. The secondary 77 of transformer 69 is rectified by a full wave rectifier 78 and is filtered by a conventional A.C. filter generally denoted by the numeral 79. The output voltages X and Y from this filter are fed to corresponding terminals X and Y of the amplifier to provide the desired operating voltages. The D.C. amplifier, consisting of transistors 66 and 67 is energized by the transformer 70, the secondary 80 of which is rectified by a half wave rectifier 81 and the output terminal connected to the terminals of the amplifier. A filter system is not required for the voltage supplied to the transistors 66 and 67, since the rectified voltage applied to this section of the amplifier is in the form of interrupted D.C. However, the voltage applied to the detector 10 must be in phase with the voltage used to energize the transformer 70 so that the rectifier 81 can then be polarized to apply voltage to the transistors 66 and 67 at the same time a signal to be amplified is applied to the base of the transistor 66 by terminal 65. This system is also advantageous inasmuch as it applies collector voltage to the transistors only during the time it is necessary for them to effect amplification. During the other half of the cycle, the transistors are inoperable.

The reference voltage applied to the terminals 51 and 52 is obtained from the secondary 82 of transformer 71 which is applied to a potentiometer 83 for adjustment of the reference voltage to any desired value for the purpose previously described.

The use of transistors as the amplifying means for amplifier 11 affords an important advantage in this control system in that the upper cut off of the transistor is sharp and it effectively limits the maximum voltage that can be generated and applied to the coil 68 of the electromagnet 23.

In order to obtain added stability in the operation of this control system it has been found that the use of an appropriate feedback circuit can be used to considerable advantage for this purpose. One form of feedback involves a modificaiton of the reference signal applied to terminals 51 and 52 with changes in the branch line 24. For this purpose branch pressure is used to operate a transducer 84 to effect a modification of an electrical characteristic as, for instance, a change in resistance. This controlled electrical element is connected by leads 85 and 86 to an electrical device 87 for generating an output voltage in accordance with changes effected by the transducer 84. This voltage is fed by conductors 88, 89, 90 and 91 to the terminals 51 and 52. In this way, variations in branch pressure as a result of fluctuations in the penumatic relay 12 can be substantially minimized. Furthermore, the relationship between a change in detector voltage and the resultant branch pressure can be modified to obtain the desired sensitivity without the necessity of changing the sensitivity of the amplifier itself.

A modified embodiment of the invention resides in the use of feedback from the branch line 24 to the input terminals 53 and 54 of the amplifier. In this case, the leads 88 and 89 would be connected as illustrated in dotted outline to the input of the amplifier and connected to modify the detector voltage fed to the input terminals. Feedback about the entire system will automatically compensate for changes in either the electrical or pneumatic portions of the control and thereby afford highly stable performance.

While only certain embodiments of the invention have been illustrated and described, it is apparent that modifications, changes and alterations may be made without departing from the true scope and spirit thereof.

What is claimed is:

1. A fluid control device comprising an amplifier for amplifying a control voltage variable relative to a predetermined value, an independent source of reference voltage interconnected with said amplifier to modify said amplified control voltage for adjustably relocating the range of variations of magnitude of the amplified control voltage uniformly relative to a predetermined reference and electromagnetic fluid valve control means actuated by said amplified control voltage.

2. A fluid control device comprising means including an A.C. amplifier for amplifying an A.C. control voltage variable in amplitude to produce an amplified output signal, a source of alternating reference voltage connected to said amplifier and having a frequency equal to said control signal, modification of said reference voltage relocating the range of variations of the output signal uniformly relative to a selected reference level, and electromagnetic fluid pressure regulating means operated by said output signal to produce fluid pressure variations with changes in the output signal.

3. A fluid control device according to claim 2 including a transducer connected with said fluid pressure regulating means to produce a signal in response to changes in said fluid pressure and electrical connections between the transducer and said alternating reference voltage to modify the reference voltage in accordance with changes in fluid pressure.

4. A fluid control device comprising a detector responsive to changes in a physical condition to produce an alternating current control voltage variable in accordance with changes in said physical condition, means including at least one amplifier having predetermined amplifying characteristics for amplifying said control voltage to produce an output signal, an alternating current reference voltage connected to said amplifier to relocate the amplified output signal level relative to a selected reference level while maintaining said predetermined amplifying characteristics and an electrically controlled fluid pressure regulator connected to said amplifier and operable in response to said output signal to produce fluid pressure changes in accordance with changes in said control voltage.

5. A fluid pressure control device comprising means for generating an alternating current control signal variable in magnitude and polarity, an A.C. amplifier having predetermined amplifying characteristics amplifying said control signal, polarity sensitive rectifying means transforming the amplified control signal to direct current, a source of adjustable reference A.C. voltage having a frequency equal to the frequency of the control signal, connections between said source and said amplifier prior to rectification of the amplified control signal to relocate the range of variations of the amplified control signal relative to a predetermined reference level, said variations in said control signal producing a D.C. output signal variable in accordance with the control signal with said D.C. signal being variable from zero to a predetermined maximum value independently of a change in polarity of the A.C. control signal within the operable range of the control device, and electromagnetically operated fluid pressure regulator connected to said amplifier and responsive to changes in said D.C. signal.

6. In a control device according to claim 5 including pressure-voltage transducer means responsive to said fluid pressure and interconnected with said control signal to modify the magnitude of the control signal with changes in the pressure of said fluid.

7. In a control device according to claim 5 including a pressure-voltage transducer responsive to said fluid pressure and modifying the magnitude of said adjustable A.C. voltage.

References Cited in the file of this patent

UNITED STATES PATENTS

| 2,660,624 | Bergson | Nov. 24, 1953 |
| 2,865,337 | Dennis | Dec. 23, 1958 |
| 2,880,384 | Surtees | Mar. 31, 1959 |
| 2,888,941 | Grogan | June 2, 1959 |
| 2,922,930 | Schaeve | Jan. 26, 1960 |